Dec. 20, 1960 W. W. HALLINAN 2,965,126
AUTOMATIC FLOOR DRAIN SHUT-OFF VALVES
Filed Aug. 4, 1958 5 Sheets-Sheet 3

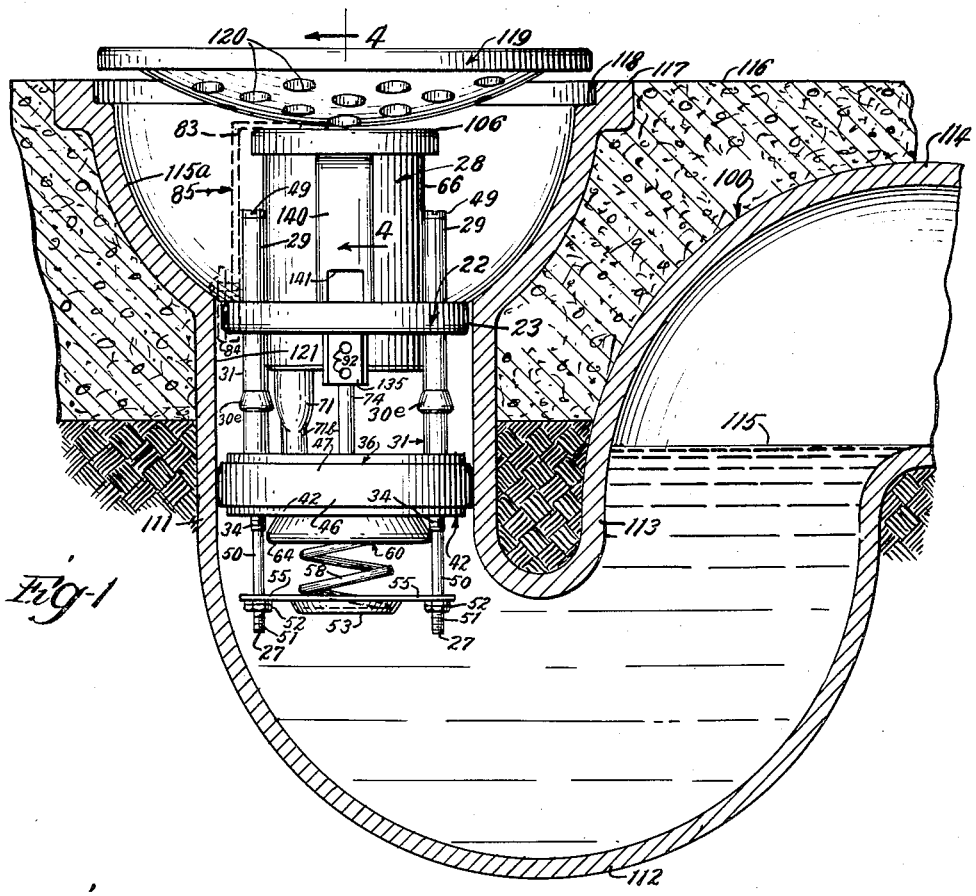

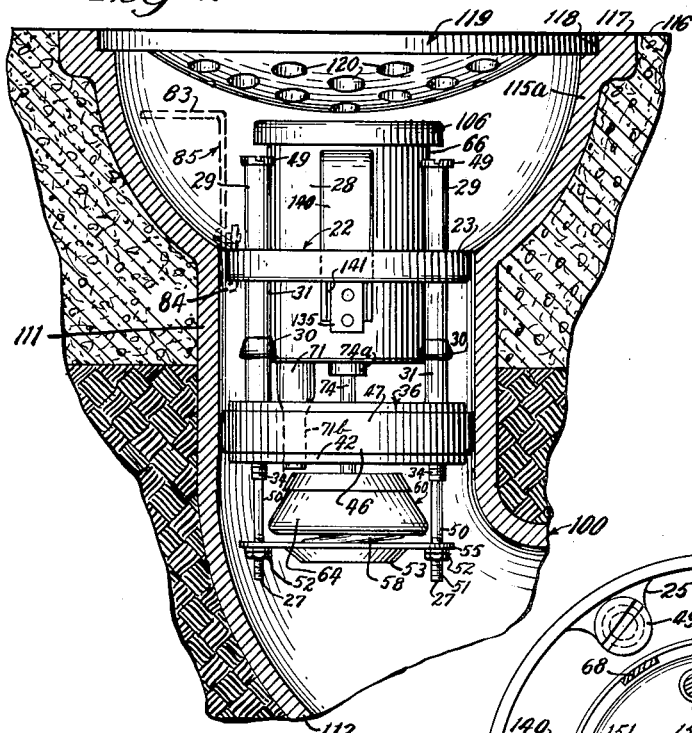

INVENTOR.
William W. Hallinan
BY
Robert H. Wendt
Atty.

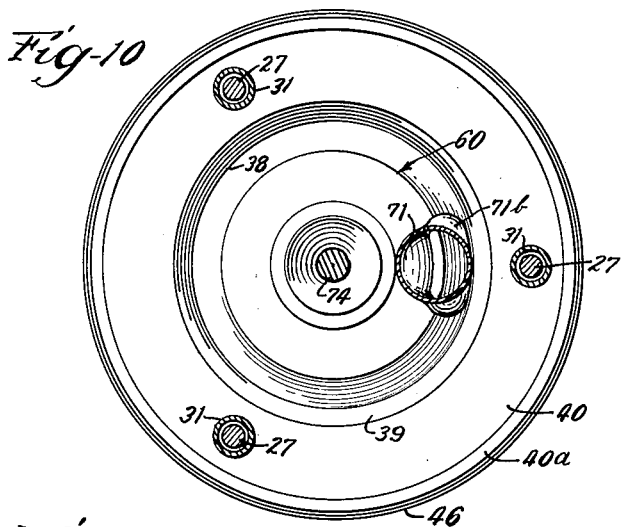
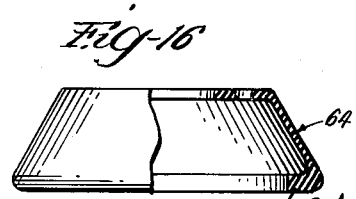
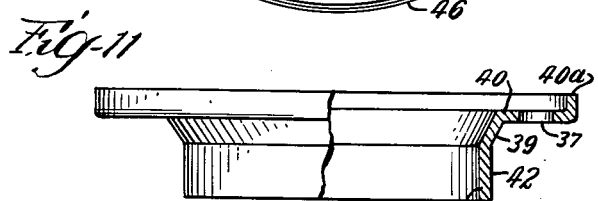
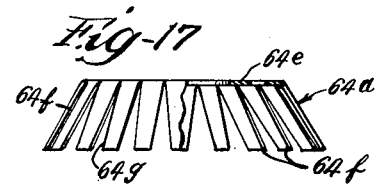
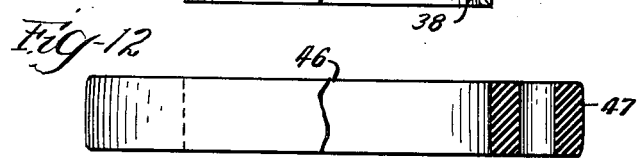
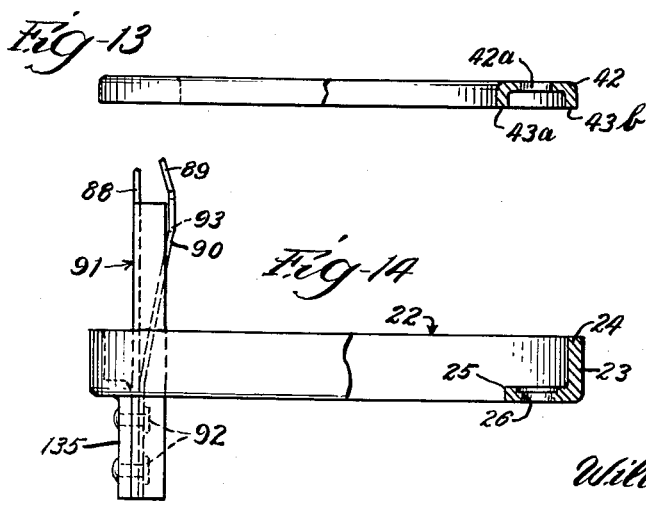

Dec. 20, 1960
W. W. HALLINAN
2,965,126
AUTOMATIC FLOOR DRAIN SHUT-OFF VALVES
Filed Aug. 4, 1958
5 Sheets-Sheet 5
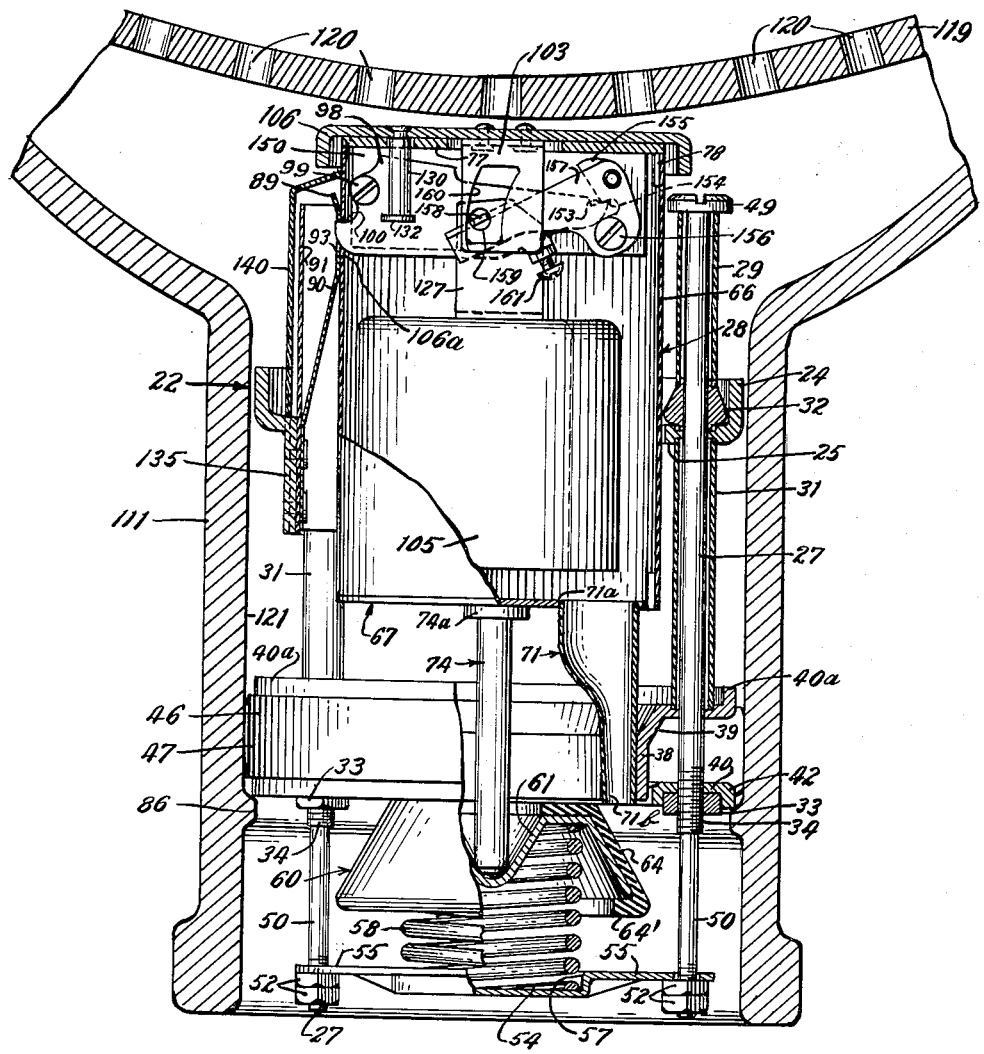
INVENTOR.
William W. Hallinan
BY
Robert H. Wendt
Atty.

United States Patent Office 2,965,126
Patented Dec. 20, 1960

2,965,126

AUTOMATIC FLOOR DRAIN SHUT-OFF VALVES

William W. Hallinan, Racine, Wis., assignor to Holly Manufacturing, Inc., Racine, Wis., a corporation of Wisconsin Filed Aug. 4, 1958, Ser. No. 752,773

1 Claim. (Cl. 137—410)

The present invention relates to automatic floor drain shut-off valves, and is particularly concerned with improvements in the automatic floor drain shut-off valves covered by my prior application, Ser. No. 568,803, filed March 1, 1956, now abandoned, of which this application is a continuation in part.

One of the objects of the invention is the provision of an improved automatic floor drain safety device which will eliminate flooding of a basement when the water passage to the sewer from the floor drain has been clogged by tree roots in the sewer, causing the draining water from plumbing fixtures in the building, such as wash basins, sinks, toilets, and the like to back up through the floor drain and flood the cellar.

Another object of the invention is the provision of an improved automatic floor drain safety device which will eliminate the flooding of a basement which is caused by the water backing up from the main sewer during rainstorms.

Another object of the invention is the provision of a device of the class described which is positive and automatic in its action, and which indicates the closing of the valve to the user by tilting the regular floor drain cover up above the floor.

Another object of the invention is the provision of a simple, durable, automatic floor drain stop which is adapted to be manufactured cheaply, since most of its parts may be made of punch press stampings.

Another object of the invention is the provision of an improved device of the class described which may be installed by the user himself, and which may be removed at any time by the user for inspection or repair, thereby eliminating the cost of labor for installation or removal, and which is adapted to save the user many dollars in damage to materials stored in the basement, which would be spoiled in case of a flood in the basement.

Another object of the invention is the provision of an automatic floor drain stop which will insure continuous safety and freedom from service, and which can be readily removed for cleaning out the floor drain.

Another object of the invention is the provision of an improved automatic floor drain safety valve in which the float is protected from the water during the ordinary drainage through the floor drain; and as soon as back flow has tripped the float, the float is again protected from that water by being located above the valve and above the water level after tripping.

Another object of the invention is the provision of an improved construction for an automatic floor drain safety valve which involves a minimum amount of machine work, and which can be tripped manually as desired, and which is very sensitive in its operation responsive to the movement of the float.

Another object of the invention is the provision of an improved construction having an improved and simplified latching mechanism adapted to be released with a snap action, and utilizing a lesser number of parts by employing an electromagnet for holding the latching lever in the latching position, eliminating the necessity for a sear in the latching mechanism, and still providing a device of suitable sensitivity, which is self-latching upon movement of the parts of the valve into the latching position.

Another object of the invention is the provision of an improved float housing structure and an improved float so constructed that the control mechanism is responsive to the presence of a sample of water taken from the back flow at a point below the valve seat only under conditions of back flow of water in the drain, and eliminating any possibility of the float being lifted by the action of the water or bubbles rising from the water when the drain is entirely submerged and water is flowing downward through the drain, but occasional bubbles of entrained air are passing upward.

Another object of the invention is the provision of an improved valve structure for my automatic floor drain safety valve to take care of the situation when the drain tile under the concrete floor of the basement have been leaking and eroding away sub-soil under the floor, thereby subjecting the bottom of the floor to a thrust which is equal to the area of the bottom of the floor which is under pressure multiplied by the pressure of the water under the floor is pounds per square inch. When the tiling leading to the sewer under the floor from the floor drain is watertight, no heavy thrust will occur on the bottom of the floor; and there is usually no possibility of the floor buckling upward under water pressure when the drain opening is closed. There have been instances of the concrete floor buckling when drains have been closed by other closures or valve devices than those embodying the present invention; and it is another object of the invention to avoid the possibility of destructive action of excessive pressure over an excessive bottom floor area by providing an improved valve member adapted to withstand only a predetermined amount of pressure per square inch and adapted to collapse automatically and to be forced upward through the valve port past the valve seat to release the water pressure from below, thereby preventing any possibility of the floor buckling.

Another object of the invention is the provision of an improved releasable valve structure which is adapted to withstand water pressures under closed conditions, but which is also adapted to collapse and pass through the valve opening, releasing the water and pressure at a predetermined elevated pressure to eliminate the possibility of breakage of other associated parts of the assembly with a drain structure.

Another object of the invention is the provision of an improved guard to be applied to the valve assembly under display conditions for preventing the injury of observers or users and limiting the motion of the float housing outward from the assembly when the device is tripped under demonstrating conditions.

Another object of the invention is the provision of such an improved guard that is also adapted to be used in the placement of the automatic valve assembly in the drain, and which can be removed from the assembly easily when the valve has been installed in the drain.

Another object of the invention is the provision of an improved drain head assembly which is provided with an integral annular rib against which this automatic valve assembly may be seated with the cover of this device at the proper elevation to clear the strainer when it is cocked and elevate the structure when the safety valve is tripped and closed, thereby indicating the condition of closure caused by back water flow, without necessity for making exact measurements to locate the present valve assembly in the drain tile at the proper position.

Other objects and advantages of the invention will be apparent from the following description and the accompanying drawings, in which similar characters of reference indicate similar parts throughout the several views.

Referring to the drawings, of which there are five sheets,

Fig. 1 is a view in partial section taken on a vertical plane through the floor drain and water trap, showing one of the devices embodying my invention installed and with the valve in the closed position, tripped by hand or by back water, this closed position being indicated by elevation of the floor drain plate;

Fig. 2 is a similar fragmentary sectional view with the automatic valve in the cocked position, the valve being open and the drain plate being seated in its usual position, which indicates that the automatic valve is latched open to permit floor drainage to pass through it; but it is cocked to be tripped by flow of back water through the drain;

Fig. 3 is a fragmentary side elevational view of the top portion of the improved magnetic latching mechanism and float housing;

Fig. 4 is a fragmentary sectional view, taken on the plane of the line 4—4 of Fig. 1, looking in the direction of the arrows, with the parts in the position which they assume in the course of being latched;

Fig. 5 is a view in perspective of the latch keeper and latch housing assembly;

Fig. 6 is a fragmentary top plan view in partial section, taken on the plane of the line 6—6 of Fig. 8, looking in the direction of the arrows, showing the details of structure of the latching mechanism and float;

Fig. 7 is a fragmentary sectional view taken on the plane of the line 7—7 of Fig. 8;

Figure 8:
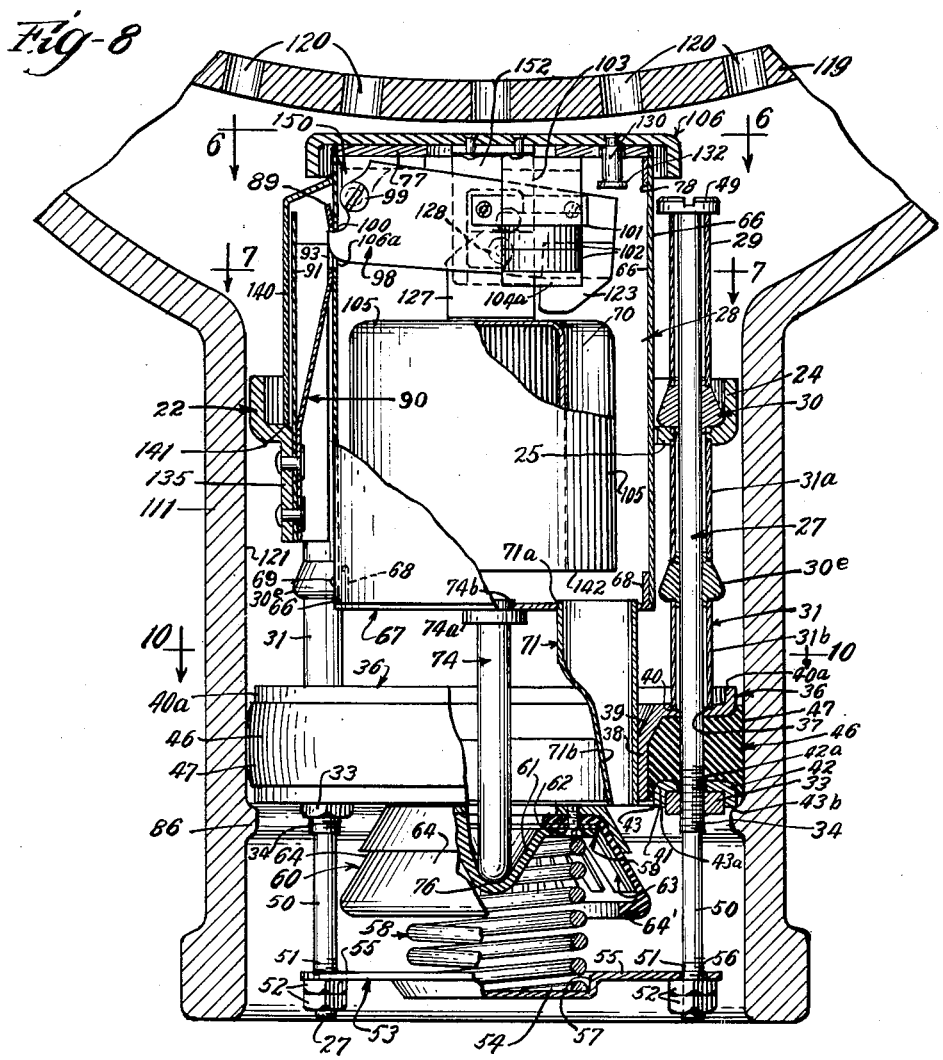
Figure 9:
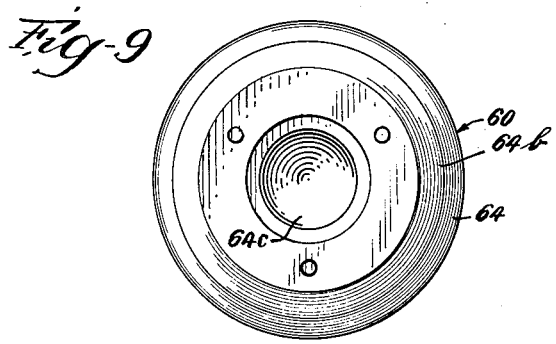

Fig. 8 is a full size vertical sectional view in partial section taken on the plane of the line 8—8 of Fig. 6, looking in the direction of the arrows, with the valve in the latched open position, showing the relation of the valve to an improved drain pipe head which is provided with an integral inwardly extending rib for seating and supporting the present automatic valve assembly at the proper level so that it clears the drain plate when the valve is open and the device is cocked, as shown also in Fig. 2; but it lifts the drain plate when the valve is closed and tripped, as shown in Fig. 1, the position of the drain plate indicating the condition of the automatic valve;

Fig. 9 is a top plan view of the valve plug;

Fig. 10 is a sectional view taken on the plane of the line 10—10 of Fig. 8, looking in the direction of the arrows;

Fig. 11 is a side elevational view of the upper ring forming part of the packing casing, in partial radial section;

Fig. 12 is a similar view of the resilient packing member;

Fig. 13 is a similar view of the lower packing casing ring;

Fig. 14 is a similar view of the upper supporting ring taken on a plane which shows the latching keeper and keeper housing in elevation;

Fig. 15 is a side elevational view in partial section, on a radial plane, showing the uppermost valve plate;

Fig. 16 is a similar view of a resilient collapsible valve body;

Fig. 17 is a similar view of a resilient valve expanding spring adapted to support the valve until the upward pressure reaches a predetermined amount;

Fig. 18 is a similar view of the lower valve plate;

Fig. 19 is a side elevational view of a frusto-conical guide for the lower part of the float housing.

Fig. 20 is a view similar to Fig. 8 of the preferred commercial embodiment of the invention.

Referring to Figs. 1 and 2, 100 indicates in its entirety the floor drain trap, which comprises a vertical cast iron pipe portion 111 joined to a U-shaped bend 112 at the bottom and having an upwardly extending pipe portion 113, which is again bent laterally at its uppermost portion 114, the level of the water in trap being indicated at 115 above the highest point in the bend 114.

The floor drain 100 is provided with a belled out opening portion 115a flush with the top of the floor 116 at its upper edge 117, and has an annular seat 118 for the drain cover 119, having a multiplicity of holes 120 for passing drainage.

The vertical portion 111 of the drain trap has a cylindrical bore 121, within which the present automatic floor drain valve is installed. This device preferably includes a frame having an annular metal member 22 used as a support ring, and having an outer cylindrical surface 23, which is receivable in the bore 121.

The support ring 22 may have a clearance in the bore 121 and preferably comprises a sheet metal stamping which has an annular flange 24 (Fig. 8) and a plurality of radial inwardly extending flanges or lugs 25, preferably three in number. The inwardly extending lugs 25 are each provided with a through bore 26 for passing the clamping bolts 27, of which there are three, which preferably have a clearance with respect to the bores 26.

In order to guide the float housing 28, which is slidably mounted between the three equally spaced lugs and bolts, the bolts are provided with cylindrical bodies and larger cylindrical heads 49, which serve as guides for engaging the float housing 28 with a line contact.

Each of the bolts is preferably provided with a spacer tube 29, which may be made of brass, comprising a cylindrical member having a cylindrical bore and plane ends, one ends engaging under the head 49, and the other end engaging a spacing ferrule 30 on each bolt, the spacing ferrules preferably having a reduced sleeve portion 30a and 30b at its ends, and having a frusto-conical body 30c with rounded contact corners 30d.

The reduced portion 30a at the upper and smaller end of each spacer ferrule fits in the spacer tube 29, which has a larger bore than the diameter of the bolts 27. The reduced end 30b on each spacer ferrule 30 fits in the bore 26 of the lug 25 in each case and accurately centers the ferrule on the supporting ring 24.

Each of the bolts 27 is provided below the support ring 24 with an additional spacer tube 31 of the same construction, having flat ends to be clamped between the support ring 24 and the packing casing 36.

As the float housing 28 needs additional guiding means on the side opposite its latch, one of the spacer tubes 31 comprises two parts 31a and 31b separated by another fruso-conical ferrule 30e identical in construction with the ferrule 30 and fitting over the reduced ends of the ferrule 30e in the same manner to clamp it in place and engage the spacer tubes 31a, 31b.

The rounded edge surfaces 30d on the ferrules 30 and 30e engage the float housing 28 and guide it in its sliding motion.

Each of the bolts 27 is provided with a threaded portion 34 adjacent to but spaced from its lower end and engaged by threaded nuts 33 below the packing casing 36. The ends of the tubes 31 provide annular shoulders engaging the top of the packing casing 36.

Packing casing 36 comprises a sheet metal stamping having a tubular portion 38 and a frusto-conical portion 39 carried by a radial flange 40. Radial flange 40 is preferably reinforced by having an upwardly turned cylindrical flange 40a; and the ring is provided with a plurality of equally spaced circular bores 37 for passing the bolts 27, which rotate in said bores.

The reinforcing flange 40a on packing casing 36 has a clearance with the inside of the drain pipe bore 121 so that it may be small enough to be received in any drain pipe in spite of inaccuracies of manufacture of the pipe.

The tubular portion 38 of packing casing 36 has an outer cylindrical surface 41 for slidably engaging and receiving a lower pressure ring 42, which has a circular bore 43. The lower pressure ring preferably comprises a sheet metal stamping of annular shape, having two downwardly turned annular cylindrical flanges 43a and 43b serving to reinforce the ring and to act as a nut retainer for preventing rotation of the three nuts 33.

The pressure ring 42 is provided with three apertures 42a for passing the threaded portions 34 of bolts 27. A resilient annular member 46 of rubber or synthetic resilient materials, such as "Duprene," is located in the annular groove between the upper flange 40 of packing casing 36 and the pressure ring 42 and is shaped to fit that space at the frusto-conical portion 39.

The annular packing member 46 has three apertures registering with the apertures 37 and adapted to pass the bolts 27; and its size is such that its outer cylindrical surface 47 is smaller than the bore 121 so that it may be received in the bore of the drain pipe.

When the device has been inserted in the bore 121 of a drain pipe to the proper level, the bolts 27 may be rotated by applying a screwdriver to the slots in the heads 49; and the lower threaded portions 34 engaging in the threaded nuts 33, which are held against rotation, cause the nuts 33 to progress upward on the bolts 27, engaging the pressure ring 42, and causing it to compress the resilient packing member 46.

As the resilient annular member 46 is confined at its top, inside, and bottom, it is expanded by compression in an outward direction, engaging the inside of the bore 121 in the drain pipe 111 and establishing a firm mounting for the automatic valve unit, while also effecting a water-tight engagement between the packing casing 36 and the drain pipe.

Drainage may flow downward through the packing casing 36 at the frusto-conical surface 39 and inside the tubular portion 38, when the valve is open, as further to be described.

Each of the bolts 27 has a cylindrical extension 50 of reduced size, which is threaded at 51 at its lower end and provided with a pair of lock nuts 52. These extensions 50 are adapted to support a spring seat 53 in the form of a triangular plate, having three radially extending arms 55 provided with apertures 56 for receiving the reduced extensions 50. The lock nuts 52 are secured on the threaded portion 51 below the spring plate 53; and the plate 53 has a centrally located stamped cylindrical depression 57, forming a seat for receiving the end of a helical compression spring 58, which preferably has its end turns flattened and brought into the same plane as indicated at 54.

The compression spring 58 engages at its upper end in the V-shaped annular groove 59 in the valve member 60. The valve member 60 may comprise a sheet metal stamping having a conical central portion 61, and having a reverse curve at 62 and a backwardly extending frusto-conical portion 63.

In some embodiments of the invention this valve member 60 may be covered over all by a molded valve covering material 64 of resilient rubber or "neoprene" held in place by an inwardly extending lower flange 64'.

In other embodiments of the invention the further improved collapsible valve structure of Figs. 15–18 may be employed.

The outer frusto-conical surface 64 of the valve covering is adapted to engage the valve seat formed by the end of the circular bore 38 in the packing casing 36.

The compression spring 58 is centered in the valve member 60 by being engaged about the central conical portion of the valve, and tends to center the valve and tilt it in such direction that it effects a tight closure of the bore 38 in the packing casing when closed by the spring.

The valve member 60 in some embodiments may be of the type shown in Figs. 15–18, in which the valve may comprise a resilient rubber covering 64 (Fig. 16), a Phosphor bronze spring 64a, an upper valve plate 64b, and a lower valve plate 64c riveted together.

The upper valve plate 64b has a frusto-conical flange 64d, which stops short of the seat 38 so that the seat is engaged only by the frusto-conical resilient cover 64. This is reinforced by the resilient Phosphor bronze spring 64a, having an annular body 64e and a multiplicity of spring fingers 64f, which extend backward in the form of a cone with tapered slots 64g between the spring fingers.

This permits the rubber covering 64 to act as a valve, closing the aperture 38 until there is sufficient pressure below the valve to cause the entire valve to collapse and to be pushed upward through the opening 38 at a predetermined pressure as a safety measure against the increase of pressure to such a point at which the floor might be damaged by buckling upward.

Such damage to the floor can only happen when there is such leakage in the drainage pipes below the floor that a large area of the floor becomes subjected to hydraulic pressure below the floor. This cannot happen when the floor is properly bottomed against the soil and the drainage pipes are tight; and the valve structure of Figs. 15–16 need only be employed where there is necessity for such a safety measure.

The parts of the valve 64, 64a, 64b and 64c are preferably riveted together to form a unit.

The float housing 28 preferably comprises a cylindrical metal member made of metal, such as bronze, which will be free from corrosion and adapted to slide inside the guides provided by the heads 49 and ferrules 30. The float housing 28 has a cylindrical outer wall 66 and a flat lower wall 67; but the lower wall 67 may comprise a sheet metal stamping of circular shape having three upwardly extending metal tabs 68 engaging inside the cylindrical wall 66, where the tabs may be secured by having integral pressed formations 69 engaging in complementary depressions in the side wall 66.

The edge at the end of the cylindrical side wall 66 is overlapped by the end wall 67; and thus the end wall 67 may be pressed into place and held against the end of the side wall 66 by the pressed formations 69.

The end wall 67 is preferably closed except for a downwardly extending sample tube 71 of brass, which has its upper cylindrical end secured by solder or otherwise at 71a in the bottom 67. Sample tube 71 is preferably flattened into oval shape at its lower end 71b so that it is narrow at the point where it extends through the bore 43 against the tubular portion 38, where the sample tube 71 should not interfere with the valve member 60.

The sample tube 71 extends to a point below the packing casing 36 and receives its sample of upwardly moving water from a point where there is a maximum restriction to the flow of water upward; but downwardly flowing water is directed past and away from the sample tube.

The sample tube is shown in Fig. 8 in the position which it assumes when the valve is open, extending down into the valve opening; but when the valve becomes closed, as shown in Fig. 1, the sample tube is lifted with the float housing out of the bore of the valve seat 38.

The lower wall 67 of the valve housing supports a valve actuating post 74, which may have an annular thrust member 74a below the wall 67, and extends through the wall 67, being riveted over at 74b to secure the post 74 to the float housing.

Valve actuating post 74 may be provided with a chamfered end 76, which engages in the apex of the V-shaped valve stamping 61. The valve post 74 urges the valve member 60 into open position, as shown in Figs. 2 and 8, when the present device is latched in that position.

When released by the latch, valve housing 28 moves upward, permitting the post 74 to move upward; and valve member 60 is automatically closed under the force of spring 58, and centers itself against the valve seat 43 on the packing casing 36.

The float housing 28 has its upper end closed by end wall 77, which is cylindrical and engages the end of the upper wall 66, except for three downwardly extending tabs 78 fitting inside the side wall 66 and secured thereto by screw bolts.

The upper wall 77 is closed except for the passage of parts of the movable cover and the latching mechanism; but the cover 106 extends over the upper wall 77 of the float housing 28 and prevents water from running into it from the top.

The top cover 106 preferably has three depending headed studs 130; and the studs slide in the top wall 77, permitting the cover to move on the float housing 28 as limited by the heads 132 so that the cover may be used for setting the device and for manual release.

Various types of latching mechanism may be employed, such as that shown in my prior patent, mentioned above; but the device shown herein employs a simplified form of latching mechanism utilizing permanent magnets for effecting a snap action and a sensitive release.

The latching mechanism is preferably mounted upon a supporting plate 77 of circular shape and provided with a pivot bracket 150 depending therefrom and secured thereto by an angle flange 151. Pivot bracket 150 pivotally supports a latching lever 98 by means of a pivot screw 99 located adjacent the shorter end of the latching lever 98, which is provided with a latching shoulder 100.

The latching lever 98 is provided with an armature 101 projecting laterally from the lever and secured thereto by a plurality of screw bolts; and the armature 101 comprises a rectangular block of metal located immediately above one or more permanent magnets 102.

The permanent magnets 102 are preferably of U shape and are also supported by the plate 77, which may have a U-shaped bracket 103 secured to plate 77 by screw bolts, and having the magnets 102 clamped to its lower flange by a screw bolt 104 and a clamping plate 104a. Screw bolt 104, clamping plate 104a, and bracket 103 are all preferably made of brass or some other nonmagnetic metal; and the armature 101 is made of sufficient width to embrace or engage both of the legs of the U-shaped magnets 102.

In the position shown in Figs. 3 and 4 the latching lever 98 is unlatched; that is, in its uppermost position when moving counterclockwise in Fig. 4, as this places the latching shoulder 100 out of range of engagement with the latch 90 further to be described.

The latching lever is held in latched position by the permanent magnets 102 when it is in the position of Fig. 8, at which time a certain amount of force is exerted on the latching lever by the spring 58 and other mechanism, tending to turn the latching lever counterclockwise in Fig. 8; but this is resisted by the magnets acting on the armature.

The float housing 28 is provided with an aperture 106a, which communicates with a latch housing 140 mounted on one side of the float housing 28, and closed on all sides except its lower end. The float housing has a rectangular slot beiginning at 141 (Fig. 8) for passing a supporting bracket 135, which may form an integral part of the upper supporting ring 22. Bracket 135 is offset inwardly and depends from ring 22 at one side thereof and supports the spring latch 90 and a latch guide member 91, as shown in Fig. 14, by a plurality of rivets.

The spring latch 90 comprises a strip of spring bronze having a rectangular aperture at 93 for receiving the latching shoulder 100 and retaining it when the parts are in the position of Fig. 8. The spring latch 90 is also bent outwardly at its upper end 89 so that the bevel at this point tends to cause the latching lever 98 to pass the spring latch, which springs back until the latching shoulder 100 passes into the aperture 93.

The latch guide member 91 comprises a channel of U shape, which has a sliding fit in the latch housing 140, so guiding the latch 90 that its aperture 93 is always guided over the latching shoulder 100. To guide the latch 90 most effectively and still provide a clearance at their points, the upper end of the latch housing 91 has a laterally enlarged flange 88, the edges of which engage the side walls of the latch housing 140 to make sure that the aperture 93 is guided over the shoulder 100 at all times.

The latching lever 98 is provided with a float hanger bracket 127, comprising an angle member having one flange secured to the float 105 and the other flange extending vertically and pivotally mounted on the latching lever 98 by means of a screw bolt 128.

The float 105 may comprise a drawn copper cup closed at its upper end and open at its lower end 142, since such an open end acts in connection with the water level as though it were closed, trapping the air inside the float and causing the float to be lifted when the water level rises sufficiently.

The float 105 is generally cylindrical, but is formed on the side toward the sample tube 71 with an integral pressed tunnel 70 of semi-circular shape, forming a groove in the outer side of the float 105, which is in substantial registry with the upper end of sample tube 71.

The pivot screw 128, supporting the float, has an elongated aperture in its bracket 127, giving the float 105 a limited amount of lost motion with respect to the latching lever 98; but the latching lever is provided with a depending lug 123, which is engaged by the top of the float, permitting the float to actuate the latching lever upward positively.

The latching lever 98 naturally tends to hang down by gravity at its right end in Fig. 8, assuming the latching position. The cover 106 carries a re-set bracket 152 fixedly secured thereto and depending therefrom and pushing the latching lever down at its right end upon a down push of the cover when the cover is used to latch the latching lever 98.

Re-set bracket 152 has a pin and slot connection to the latching lever 98 so that an up pull on the cover 106 moves the latching lever 98 counterclockwise in Fig. 8, releasing the latching lever 98 at its latching shoulder 100. This permits the float housing to spring upward from the position of Fig. 2 to that of Fig. 1, closing the valve 60 upon back flow of water from the sewer drain.

The automatic valve unit is preferably secured in the drain pipe bore 121 at such a height that the cover 106 (Fig. 2) just clears the drain strainer plate 119 when the device is cocked or latched with the valve open; but when the latch is tripped and the float housing 28 rises with the valve, closing the valve port, the cover 106 engages beneath the drain strainer plate 119, as shown in Fig. 1, and lifts it off its seat 118.

This involves the placing of the automatic valve unit at a predetermined level, which can be done in any drain pipe; but the particular drain pipe head shown in Fig. 8 has its bore 121 provided with an inwardly extending integral rib 86, which is located to engage and support the bottom ring 42 of the packing casing 36 when the automatic valve unit is at the proper level. This saves considerable measurement and calculation and adjustment.

In order to place the valve unit in the drain it may be provided with a removable bracket member 85 (Fig. 2) in the form of an angle iron strap having a U-shaped formation 84 at its lower end hooked under the upper supporting ring 22.

This same angular supporting bracket 85 may be reversed, as shown in dotted lines in Fig. 1, and secured by a screw passing through both flanges of the U-shaped formation 84 to secure the bracket to the upper ring with its upper horizontal portion 83 overhanging the top cover 106 during shipment and display.

In this position the bracket 85, shown in dotted lines in Fig. 1, serves as a safety shipping and display bracket for preventing accidental ejection of the float housing 28 from the mechanism if it should be cocked by a user or observer when it is on display, as the float housing 28 can never be ejected farther than the closed valve position of Fig. 1. Naturally the bracket 85 is removed from the assembly before installation in Fig. 1 and after installation in Fig. 2.

The operation of the present automatic drain valve is as follows. When it is installed in the drain at the proper level, as shown in Figs. 1, 2, and 8, the float and latching mechanism are above the water line 115, even when the device is cocked; and the float 105 is latched in the lower valve open position, as shown in Fig. 8.

The method of installation is merely to lower the unit into the drain pipe 111 until its lower ring rests on the integral rib 86; or in the absence of such a rib, until the unit is at the proper level, as shown in Figs. 1 and 2.

When at the proper level, a screwdriver is applied to the heads 49 of the bolts 27 to turn these bolts clockwise, which causes them to progress downwardly with respect to the nuts 33, drawing the nuts 33 upward and drawing the ring 42 upward relative to the ring 40 of packing casing 36.

This compresses the packing 46 and causes it to bulge out into water-tight engagement with the walls of the bore 121 in drain tile 111, securing the unit in the drain tile at the proper level. In order to set the unit with the valve open, the operator need only to press down on the top cover 106, in which case the latching lever 98 will pass the latch 90 and pass into the aperture 93 as the float housing is pushed downward.

The latch 98 will move to the position of Fig. 8, securing the float housing 28 in this position, in which the center post 74 of the float housing 28 holds the valve 60 in open position against its spring 58. Water may then run down freely through the strainer plate 119 over the top cover 106 and over the mechanism and through the bore 38 of the packing casing and past the valve 60 into the lower part 112 of the drain.

As this water runs through the valve unit, it runs past the sample tube 71, which extends down through the valve opening 43; but it does not rise in the sample tube because the water is flowing in the wrong direction, downward; and there is no water flowing backward. If at any time water in the drain pipe 100 flows backward through the valve unit, the water will rise through the valve opening 43 and will go up into the sample tube 71, thus gaining access to the bottom of the float 105; and when there is sufficient back water flowing, so that the level is raised in the float housing 28, the float will be lifted at the right end of latching lever 98, and unlatching it at the shoulder 100.

As latching lever 98 and latch 90 are holding the valve open at this time, their release will permit the float housing 28 to spring upward due to pressure of spring 58 on post 74; and the valve 60 will be closed by spring 58, the parts then assuming the position of Fig. 1.

The lifting of the drain plate 119 then indicates to the user that his automatic drain shut-off valve has closed and should again be opened after the flood conditions have passed.

When a large amount of water is draining through the unit from the top, there is a tendency to carry bubbles of air through the valve opening 43; and these bubbles gather and eventually seek upward release.

This is taken care of by the sample tube 71, which passes air bubbles upward and prevents the actuation of the float by water coming from the top, even when the entire drain plate and unit are submerged with drain water from the top.

The float tunnel 70 is in alignment with the upper end of the sample tube 71 so that air bubbles from the sample tube pass up the float tunnel 70 and miss the float, failing to lift the float.

The sample tube insures the actuation of the float only by means of the flow of back water from the bottom of the unit passing into the lower end of the sample tube, which is located below the discharge port of the valve, when the device is cocked, as shown in Fig. 8.

This places the open end of the sample tube at a point where there is a minimum amount of back pressure below the restriction in the flow of water downward so that the downwardly flowing water can never actuate the float and trip the mechanism.

When the device is provided with the releasable valve 64 of the type shown in Figs. 15–18, this valve is adapted to withstand a back pressure from below of five pounds per square inch, for example; and when the upward pressure below the floor and in the drain pipe exceeds this pressure, the valve member 64 may collapse entirely and pass upward through the valve opening 43, releasing the pressure and preventing any possibility of the floor buckling upward under excessive pressure.

It will thus be observed that I have invented an improved floor drain shut-off valve, which has the safety feature of a releasable valve under excessive back pressure, and which also has the safety feature of having its float tripped responsive only to the back flow of water in the drain, even when the entire unit is submerged in water initially coming from above.

The present improved device includes a simplified latching mechanism having a snap action due to the holding power of the permanent magnets employed; and its structure has been simplified and made more economical use of sheet metal stampings.

The sample tube 71 and the tunnel 70 in the float are preferably located at 90 degrees to the latch, as shown in Fig. 1, so that air bubbles will pass upward on that side of the bracket 152 where there is no mechanism but the sample tube is shown opposite the latch for clarity in Fig. 20 and in Fig. 8.

Referring to Fig. 20, this is a view similar to Fig. 8 of a preferred commercial embodiment of my invention shown in my prior patent. This embodiment is adapted to be manufactured more economically by mass production methods because many of its parts are in the form of metal stampings made on a punch press, such as, for example, the packing casing parts 38, 40, the valve body 61, the spring seating plate 55, the supporting ring 24, and many other parts.

The latching mechanism operates in substantially the same manner as that in my prior patent, but differs in structure in the following respects:

The latching lever 98 and sear 155 are pivotally mounted upon an angle plate depending from the plate 77. Latching lever 98 has a pawl tip 153 engaging in a socket 154 in the sear 155. The latching lever 98 is made in the form of a thick plate of hardened brass, having a laterally turned portion for supporting the adjustment screw 161 in a threaded aperture so that the adjustment screw 161 engages the bottom of the sear 155 to adjust its range of movement.

The sear 155 is pivotally mounted on screw 156 and has upwardly extending arm 155 with a socket 154. This sear has a laterally turned flange 158, which extends through an aperture 159 in the float bracket 127 and also extends through an arcuate aperture 160 in the re-set bracket 103. The float 105 lifts the sear by means of its bracket 127, the aperture 159 of which surrounds the lateral extension 158 on the sear 155.

The operation of this embodiment is substantially the same as that of my prior patent except that the depending sample tube 71 assures the fact that the float will not be lifted except by the back flow of water taken from a point below the valve opening.

The float will not be lifted by air bubbles and will not be tripped when air bubbles are flowing up the sample tube 71 into the tunnel 70 past the float.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

An automatic floor drain and flood check valve assembly comprising a floor drain having an upper opening, a first upper metal ring receivable in the floor drain and having a plurality of vertical apertures, a headed screw bolt in each aperture, and having a threaded portion extending downwardly, a packing casing comprising a second ring having aligned apertures passing said bolts and having a third pressure ring passing said bolts, and having threaded members on said threaded end portions of said bolts, a resilient packing between said second and third rings and subjected to expanding pressure by said bolts to cause the packing to engage the inside of the floor drain, said packing casing forming a valve port, a frusto-conical valve member for closing said valve port, and having a soft resilient frusto-conical covering fitting in said port, said valve having an upper plate adapted to pass said port, and having an inner frame comprising a circular plate and a multiplicity of spring fingers forming a conical assembly engaging the inside of said frusto-conical covering and supporting the covering, a spring urging said valve toward closed position in said port, a valve post engaging a central depression in said valve, a float housing slidably supported between said bolts and supporting said valve post, a latch for holding said float housing in the valve-open position, and a float for releasing said latch upon back flow of water in the drain to close said valve, said spring fingers resisting collapse of the valve covering until a predetermined excessive water pressure is exerted on the valve, and said spring fingers permitting the valve covering to collapse and pass through said port upon increase of back pressure in the drain to a predetermined amount.

References Cited in the file of this patent

UNITED STATES PATENTS

| | | |
|---|---|---|
| 565,320 | Barratt | Aug. 4, 1896 |
| 1,149,675 | Nix et al. | Aug. 10, 1915 |
| 1,341,563 | Kaufman | May 25, 1920 |
| 1,545,762 | Hadka | July 14, 1925 |
| 1,721,746 | Pearson | July 23, 1929 |
| 1,753,724 | Shaw | Apr. 8, 1930 |
| 2,387,858 | Russel | Oct. 30, 1945 |
| 2,580,637 | Wright | Jan. 1, 1952 |